United States Patent [19]

Garner et al.

[11] 3,974,175

[45] Aug. 10, 1976

[54] NITRO-CHROMENO PYRAZOLE COMPOUNDS THEIR MANUFACTURE AND USE

[75] Inventors: Robert Garner, Bury, England; Jean Claude Petitpierre, Kaiseraugst, Switzerland

[73] Assignee: Ciba-Geigy AG, Basel, Switzerland

[22] Filed: Aug. 19, 1974

[21] Appl. No.: 498,687

[30] Foreign Application Priority Data

Sept. 6, 1973 United Kingdom............... 41964/73
July 30, 1974 Switzerland...................... 10475/74

[52] U.S. Cl............................ 260/310 R; 106/14.5; 106/19
[51] Int. Cl.[2]......................................... C07D 405/14
[58] Field of Search .................................. 260/310 R

[56] References Cited
UNITED STATES PATENTS 3,617,335 11/1971 Kobayashi...................... 260/310 R
3,697,540 10/1972 Kimura .......................... 260/310 R

FOREIGN PATENTS OR APPLICATIONS 2,103,277 4/1972 France

*Primary Examiner*—Donald B. Moyer
*Attorney, Agent, or Firm*—Joseph G. Kolodny; Edward McC. Roberts; Prabodh I. Almaula

[57] ABSTRACT

Nitro-chromenopyrazole compounds of the formula

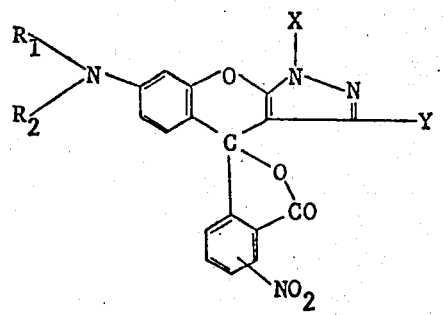

wherein
$R_1$ and $R_2$, independently of the other, represent hydrogen, alkyl with 1 to 12 carbon atoms, alkoxyalkyl with 2 to 8 carbon atoms, cycloalkyl with 5 or 6 carbon atoms, benzyl or phenyl, and X and Y, independently of the other, represent alkyl with 1 to 12 carbon atoms, alkoxy with 1 to 12 carbon atoms, phenyl or phenyl substituted by alkyl having 1 to 4 carbon atoms, nitro, halogen, amino or an amino group mono- or disubstituted by alkyl with 1 to 12 carbon atoms, acyl with 2 to 12 carbon atoms or benzyl.

The nitro-chromenopyrazole compounds are particularly useful as color formers which give intense orange-red color when they are brought into contact with an electron-accepting co-reactant.

4 Claims, No Drawings

NITRO-CHROMENO PYRAZOLE COMPOUNDS THEIR MANUFACTURE AND USE

The present invention provides novel nitro-chromeno pyrazole compounds; a process for the manufacture of such compounds and their use as colour formers in pressure-sensitive or thermo-reactive recording materials. The invention specifically relates to nitro-chromeno pyrazole compounds of the general formula

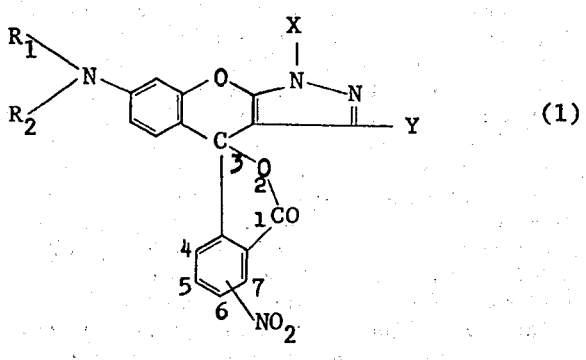

wherein
$R_1$ and $R_2$, independently of the other, represent hydrogen, alkyl with 1 to 12 carbon atoms, alkoxyalkyl with 2 to 8 carbon atoms, cycloalkyl with 5 or 6 carbon atoms, benzyl or phenyl, and
X and Y, independently of the other, represent alkyl with 1 to 12 carbon atoms, alkoxy with 1 to 12 carbon atoms, phenyl or phenyl substituted by alkyl having 1 to 4 carbon atoms, preferably methyl, nitro, halogen, amino or an amino group mono- or disubstituted by alkyl with 1 to 12 carbon atoms, acyl with 2 to 12 carbon atoms or benzyl.

When the radicals $R_1$ and $R_2$ represent alkyl, they may be straight or branched chain alkyl groups. Examples of said alkyl groups are methyl, ethyl-, n-propyl, isopropyl, n-butyl or sec.-butyl, octyl or dodecyl. Alkoxyalkyl in $R_1$ and $R_2$ may have 1 to 4 carbon atoms in each alkyl part and stands preferably for β-methoxyethyl or β-ethoxyethyl. Cycloalkyl in the meanings of these R-radicals may be cyclopentyl or preferably cyclohexyl.

As alkyl or alkoxy, X and Y are preferably methyl, methoxy or ethoxy.

Alkyl in the phenyl or N-substituted aminophenyl group X or Y may be methyl, ethyl, isopropyl, n-butyl or sec.-butyl. When X and Y are higher alkyl group having 6 to 12 carbon atoms, then they represent preferably octyl or dodecyl. Among the acyl groups the alkanoyl groups containing 2 to 4 carbon atoms such as acetyl or propionyl, are especially noteworthy. A halogen substituent may be fluorine, bromine or especially chlorine.

Particularly valuable nitro chromeno pyrazole compounds of the formula (1) are those of the formula

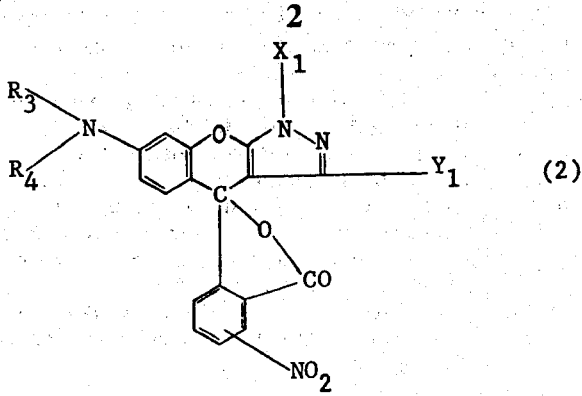

wherein
$R_3$ and $R_4$, independently of the other, represent alkyl with 1 to 4 carbon atoms or benzyl,
$X_1$ represents alkyl with 1 to 4 carbon atoms, phenyl or phenyl substituted by alkyl having 1 to 4 carbon atoms, nitro or an amino group mono- or disubstitued by alkyl with 1 to 4 carbon atoms, alkanoyl with 2 to 4 carbon atoms or by benzyl,
$Y_1$ represents alkyl with 1 to 3 carbon atoms, preferably methyl.

The alkyl, nitro and amino substituents of the phenyl radical in $X_1$ and preferably in p-position to the nitrogen atom of the pyrazole ring.

Of a special interest are nitro-chromeno pyrazole compounds of the formula

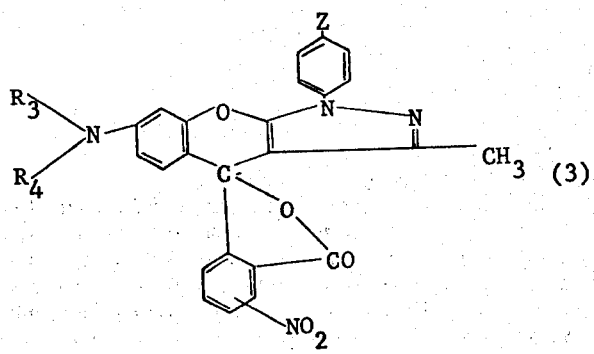

wherein
$R_3$ and $R_4$ have the given meanings and
Z represents hydrogen, methyl or an amino group mono- or disubstitued by alkyl with 1 to 4 carbon atoms, alkanoyl with 2 to 4 carbon atoms or by benzyl.

Among these compounds of formula (3), Z is preferably hydrogen, methyl or an amino group mono- or disubstituted by alkyl with 1 to 4 carbon atoms or benzyl. In this case, Z is most preferably diethylamino, dibenzylamino and especially hydrogen or methyl.

In the nitro-chromeno pyrazole compounds of the formulae (1) to (3), the nitro group of the phthalic anhydride residue is in the 4-, 5-, 6- or 7-position and the nitro-chromeno pyrazoles may be present as mixtures of these isomers.

Preferred isomeric mixtures of nitro-chromeno pyrazole compounds falling under the formulae (1), (2) and (3) are the mixtures of two isomers, wherein the nitro groups of the phthalic anhydride residue are either in 4- and 7-positions or in the 5- and 6-positions.

The nitro-chromeno pyrazole compounds according to the invention are new and may be prepared by conventional methods known in the art. A process of manufacture nitro-chromeno pyrazole compound of formula (1) comprises reacting a benzophenone compound of the formula

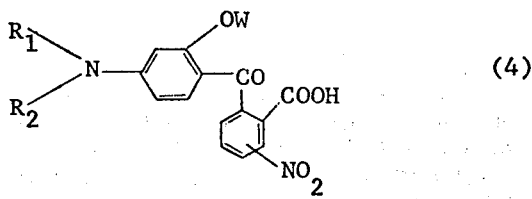

(4)

wherein
W represents hydrogen or alkyl having 1 to 4 carbon atoms, preferably hydrogen or also methyl, and
$R_1$ and $R_2$ have the given meanings, with a pyrazolone compound of the formula

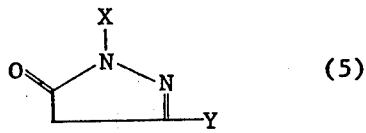

(5)

wherein
X and Y have the given meanings.

The reaction is preferably carried out by allowing the reactants to react together in the presence of an acidic condensing agent. Examples of suitable condensing agents are acetic anhydride, phosphoric acid, phosphorus oxychloride, anhydrous zinc chloride or preferably sulphuric acid of above 60% concentration. As a rule substantially equimolar amounts of the reactants are condensed, advantageously at 50° to 130° C. After condensation the reaction mixture is poured into a large amount of ice water and the precipitated product is filtered off and treated with aqueous alkali to obtain compounds of formula (1) as colourless crystals.

Compounds of formula (1), wherein X or Y or both are an N-substituted aminophenyl radical, may also be manufactured by reacting a compound of the formula (1), wherein at least one of X and Y represents aminophenyl with a reactive ester of an alkyl or benzyl alcohol with an inorganic or organic acid, such as the methyl, ethyl, n-propyl, n-butyl or benzyl ester of hydrochlorid acid, hydrobromic acid or hydroiodic acid, the dimetyl or diethyl sulphate, or with a reactive functional derivative of carboxylic acids, particularly fatty acid halides and anhydrides, such as acetyl chloride, acetyl bromide or acetic anhydride.

The starting compounds of the formula (4) are generally manufactured by reacting a nitro-phthalic anhydride or a mixture thereof with an aniline compound of the formula

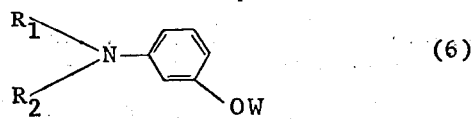

(6)

wherein $R_1$ $R_2$ and W have the given meanings. This reaction is suitably carried out in an organic solvent such as benzene, toluene, xylene or a chlorobenzone, preferably at temperatures at or below the boiling point of such solvents. The preferred nitro-phthalic anhydrides are the 3- and 4-nitro-phthalic anhydrides or a mixture of these two isomers.

The nitro-chromeno pyrazole compounds according to the invention are more or less colourless compounds which are useful as so-called colour formers when they are brought into contact with an acidic active substance, that is an electron accepting substance.

Typical co-reactants are, for example, attapulgus clay, silton clay, silica, bentonite, halloysite, aluminium oxide, aluminium phosphate, kaolin or any acidic clay, or an acid reacting polymeric material such as a phenolic polymer, an alkylphenolacetylene resin, a maleic acid-rosin resin or a partially or wholly hydrolysed polymer of maleic anhydride with styrene, ethylene, vinyl methyl ether or carboxy polymethylenes.

The preferred co-reactants are attapulgus clay, silton clay or a phenol-formaldehyde resin. These electron acceptors, preferably, are coated on the front side of the receiving sheet.

The colour formers according to the invention yield a large variety of colours, mostly strong orange, orange-red or brown-orange colours. They are thus valuable in admixture with other known colour formers in order to achieve grey or black shades.

With the present nitro-chromeno pyrazoles a range of new colour formers is provided with solubilities such as to allow greater flexibility in choice of solvents used for encapsulations and other modes of applications.

As already mentioned, the new colour formers above all are suitable for the use in so-called pressure-sensitive recording material. Such a material e.g. includes at least one pair of sheets, which comprises at least a colour former of formula (1) or of the subordinate formulae, dissolved in an organic solvent, optionally contained in pressure rupturable microcapsules, and an electron accepting substance. The colour former, upon coming into contact with the electron accepting substance produces a coloured mark at the points where the pressure is applied.

These colour formers which are comprised in the pressure-sensitive copying material are prevented from becoming active by being separated from the electron accepting substance. As a rule this is done by incorporating these colour formers into a foam-, sponge- or honey-comb-like structure. Preferably however these colour formers are microencapsulated.

When these colourless colour formers of formula (1) are dissolved in an organic solvent, they may be subjected to a microencapsulation process and subsequently used for making pressure sensitive papers. When the capsules are ruptured by pressure from e.g. a pencil and the colour former solution is thus transferred onto an adjacent sheet coated with a substrate capable of acting as an electron acceptor, a coloured image is produced. This new colour results from the thus produced dyestuff which absorbs in the visible region of the electromagnetic spectrum.

The general art of making microcapsules of some character has long been known. Well known methods e.g. are disclosed in U.S. Pat. Nos. 2,183,053, 2,800,457, 2,800,458; 3,265,630, 2,964,331, 3,418,656, 3,418,250, 3,016,308, 3,424,827, 3,427,250, 3,405,071, 3,171,878 and 2,797,201. Further methods are disclosed in British Patent Specifications 989,264 and above all 1,156,725. Any of these and other methods are suitable for encapsulating the present colour formers.

Preferably the present colour formers are encapsulated as organic solutions thereof. Suitable solvents are preferably non-volatile e.g. polyhalogenated diphenyl such as trichlorodiphenyl and its mixture with liquid paraffin, tricresyl phosphate, di-n-butyl phthalate, di-octyl phthalate, trichlorobenzene, nitrobenzene, trichloroethyl phosphate, petroleum ether, hydrocarbon oils, such as paraffin, condensed derivatives of diphenyl or triphenyl, chlorinated or hydrogenated condensed aromatic hydrocarbons. The capsule walls preferably have been deposited by coacervation forces evenly around the droplets of the colour former solution, the encapsulating material consisting of gelatine, as e.g. described in U.S. Pat. No. 2,800,457.

Alternatively the capsules preferably may be made of aminoplast or modified aminoplasts by polycondensation as described in British Patent Specification 989,264 or 1,156,725.

A preferred arrangement is wherein the encapsulated colour former is coated on the back side of a transfer sheet and the electron accepting substance is coated on the front side of a receiving sheet.

In another preferred material the new nitro-chromeno pyrazoles are co-encapsulated with one or more other known colour formers, such as crystal violet lactone, benzoyl leuco methylene blue, or a bis-indolyl phthalide.

The microcapsules containing the colour formers of formula (1) are used for making pressure-sensitive copying material of the various types known in the art, such as so called "Chemical Transfer" and "Chemical Self-contained" papers. The various systems mainly are distinguished by the arrangement of the capsules, the colour reactants and the support material.

The microcapsules may be in an undercoating of the upper sheet and the colour reactants, that is the electron acceptor and coupler, may be in the overcoating of the lower sheets. However, the components may also be used in the paper pulp. Such systems are called chemical transfer system.

Another arrangement we have in the self-contained papers. There the microcapsules containing the colour former and the colour reactants are in or on the same sheet as one or more individual coatings or in the paper pulp.

Such pressure-sensitive copying materials are described e.g. in U.S. Pat. Nos. 3,516,846, 2,730,457, 2,932,582, 3,427,180, 3,418,250 and 3,418,656. Further systems are disclosed in British Patent Specifications 1,042,597, 1,042,598, 1,042,596, 1,042,599, 1,053,935 and 1,517,650.

Microcapsules containing the colour formers of formula (1) are suitable for any of these and other systems.

The capsules are preferably fixed to the carrier by means of a suitable adhesive. Since paper is the preferred carried material, these adhesives are predominantly paper coating agents, such as e.g. gum arabic, polyvinyl alcohol, hydroxymethylcellulose, casein, methylcellulose or dextrin.

In the present application, the definition "paper" not only includes normal papers from cellulose fibres, but also papers in which the cellulose fibres are replaced (partially or completely) by synthetic fibres of polymers.

The new nitro-chromeno pyrazole compounds may also be used as colour former in thermoreactive recording material comprising at least a support, a binder, a colour former and an electron accepting substance. Thermoreactive recording systems comprise heat-sensitive recording and copying materials and papers. These systems are used e.g. for the recording of information, for example, in electronic computers, in teleprinters or telewriters, in measuring instruments. The mark-forming also can be made manually with a heated pen. A further means for inducing heat-initiated marks are laser beams. The thermoreactive recording material may be arranged in such a manner that the colour former is dissolved or dispered in a laver of the binder, and in a second laver the developer and the electron-accepting substance are dissolved or dispersed in the binder. Another possibility consists in dispersing both the colour former and the developer in one laver. By means of heat the binder is softened at specific areas imagewise and the dyestuff is formed at these points, since only at the points where heat is applied does the colour former come into contact with the electron-accepting substance.

The developers are the same electron-accepting substances as are used in pressure sensitive papers. For practical reasons the developer should be solid at room temperature and melt or evaporate above 50°C. Examples of such products are the already mentioned clays, phenolic resins, phenolic compounds such as 4-tert.-butylphenol, 4-phenylphenol, 4-hydroxydiphenyloxide, α-naphthol, 4-hydroxybenzoic acid methyl ester, β-naphthol, 4-hydroxyacetophenone, 2,2'-dihydroxydiphenyl, 4,4'-isopropylidene-diphenol, 4,4'-isopropyliden-bis-(2-methylphenol), 4,4'-bis-(hydroxyphenyl) valeric acid, hydroquinone, pyrogallol, phloroglucinol, p-, m-, o-hydroxybenzoic acid, gallic acid, 1-hydroxy-2-naphthoic acid, boric acid, and the aliphatic dicarboxylic acids e.g. tartaric acid, oxalic acid, maleic acid, citraconic acid or succinic acid.

Preferably fusible, film-forming binders are used. These binders should be water-soluble, since the nitro-chromemo pyrazoles and the developer are water-insoluble. The binder should be able to disperse and fix the colour former and the developer at room temperature. In this way the two reactive components are present in the material in a nonassociated form. After applying heat, the binder softens or melts, which enables the colour former to come into contact with the developer and to form a dyestuff.

Water-soluble or at least water swellable binders are e.g. hydrophilic polymers such as polyvinyl alcohol, polyacrylic acid, hydroxyethylcellulose, methylcellulose, carboxymethylcellulose, polyacrylamide, polyvinylpyrrolidone gelatine or starch.

In so far as the colour former and the developer are coated in two separate layers, binders which are water-insoluble may be used, i.e. binders soluble in non-polar or only weakly polar solvents, e.g. natural rubber, synthetic rubber, chlorinated rubber, alkyd resins, polystyrene, styrene-butadiene coppolymers, polymethylmethacrylates, ethylcellulose, nitrocellulose or polyvinylcarbazole.

The preferred arrangement, however, is colour former and developer in a water-soluble binder in one layer.

The coatings of the thermoreactive material may contain further additives. To improve the degree of whiteness, to ease the printing of the papers and to prevent the sticking of the heated pen, these materials may contain e.g. talc, $TiO_2$, ZnO or $CaCO_3$. In order to produce the dyestuff only within a limited temperature range there may be added substances such as urea, thiourea, acetanilide, phthalic acid anhydride or other corresponding meltable products which induce the simultaneous melting of colour former and developer.

Typical thermoreactive recording materials wherein the present colour formers may be used e.g. are described in German Patent application No. 2,228,581, French Pat. No. 1,524,826, Swiss Pat. No. 407,185, German Patent application No. 2,110,854, Swiss Pats. Nos. 164,976, 444,196 and 444,197.

The following non-limitative examples illustrate the present invention. Percentages are expressed by weight, unless otherwise stated.

Manufacture of 2-hydroxy-4-diethylamino-2'-carboxy-nitrobenzophenone isomeric mixtures.

A. 10.6 g of 4-nitro-phthalic anhydride and 8.25 g of 3-diethylamino-phenol are dissolved in 25 ml of ethyl acetate. The solution is then stirred for 6 hours at 80°C and evaporated to dryness. The resultant product is taken up in cyclohexane and the cyclohexane solution is filtered hot. The precipitate that forms in the filtrate upon cooling is filtered off and dried, to give the mixture of the two isomers 2-hydroxy-4-diethylamino-2'-carboxy-4'-nitro-benzophenone and 2-hydroxy-4-diethylamino-2'-carboxy-5'-nitro-benzophenone in a yield of 72% of theory.

B. The mixture of the two isomers 2-hydroxy-4-diethylamino-2'-carboxy-3'-nitro-benzophenone and 2-hydroxy-4-diethylamino -2'-carboxy-6'-nitro-benzophenone is obtained by substituting 3-nitro-phthalic anhydride for the 4-nitro-phthalic anhydride used in (A) and using benzene instead of ethyl acetate and otherwise carrying out the same procedure.

EXAMPLE 1

A mixture of 0.87 g of 1-phenyl-3-methyl-5-pyrazolone and 1.8 g of an isomeric mixture of 2-hydroxy-4-diethylamino-2'-carboxy-3'-nitro-benzophenone and 2-hydroxy-4-diethylamino-2'-carboxy-6'-nitro-benzophenone as manufactured in (B) is stirred for 6 hours at 90°C in 5 ml of 98% sulphuric acid. The resulting solution if then poured on 50 ml of ice water. The precipitate is filtered off and taken up in chloroform. The chloroform solution is washed with an aqueous sodium carbonate solution and with water, dried over magnesium sulphate and concentrated to dryness. The resultant product is extracted with cyclohexane in a Soxhlet apparatus to give the colour former isomeric mixture of the formula (7) in 68% yield.

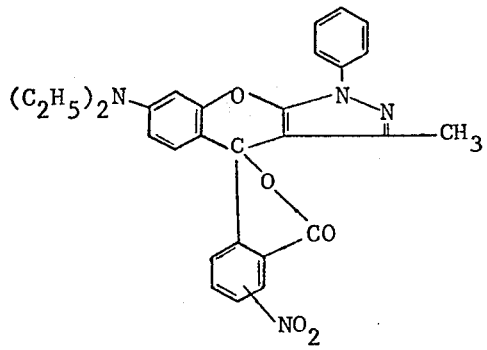

(7)

In the formula, the nitro groups are in the positions 4 and 7. This isomeric mixture melts at 258°C. A solution of this isomeric mixture in 95% acetic acid has λ maximum values at 492 and 516 nm. If this nitro-chromenopyrazole mixture is brought into intimate contact with Silton clay, it has λ maximum values of 492 and 519 nm.

EXAMPLE 2

The nitro-chromenopyrazole isomeric mixture of the formula (7), in which the nitro groups are in positions 5 and 6 of the phthalic anhydride radical, is obtained by substituting the nitrobenzophenone isomeric mixture manufactured according to (A) for the nitrobenzophenone isomeric mixture manufactured according to (B) and otherwise carrying out the procedure as described in Example 1. This isomeric mixture melts at 150°C. A solution of this isomeric mixture in 95% acetic acid has λ maximum at 513 nm. If the isomeric mixture is brought into contact with Silton clay, it has λ maximum values of 496 and 517 nm.

EXAMPLE 3

The nitro-chromenopyrazole isomeric mixture of the formula

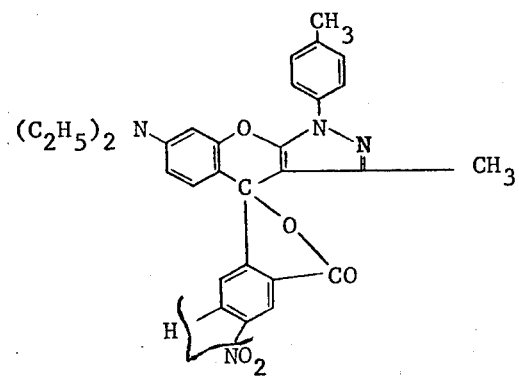

in which the nitro groups are in the positions 5 and 6 of the phthalic anhydride radical, is obtained by substituting 0.94 g of 1-p-methylphenyl-3-methyl-5-pyrazolone for the 1-phenyl-3-methyl-5-pyrazolone used in Example 2 and otherwise carrying out the procedure as described in Example 1. This isomeric mixture melts at 213°C. A solution of this mixture in 95% acetic acid has λ maximum at 511 nm. If this mixture is brought into contact with Silton clay, it has λ maximum values of 496 and 518 nm.

USE EXAMPLES

EXAMPLE 4

Manufacture of a copying paper which is sensitive to contact pressure

A solution of 3 g of the nitro-chromenopyrazole isomeric mixture according to Example 1 in 97 g of hydrogenated terphenyl is emulsified in a solution of 12 g of pigskin gelatin in 88 g of water of 50°C. A solution of 12 g of gum arabic in 88 g of water of 50°C is then added. The emulsion is diluted by addition of 200 ml of water of 50°C and the coacervation is effected by pouring the emulsion into 600 g of ice water and stirring for 3 hours. The resultant suspension is applied to paper as a layer and dried. If this paper is placed with its coated side on a sheet of paper coated with attapulgite clay, Silton clay, silica or a phenolic resin and the surface sheet is written on by hand or by typewriter, an orange-red copy is obtained on the coreactive sheet and the developed image has excellent fastness to light. Corresponding effects can be obtained by using each of the other colour former isomeric mixtures of Examples 2 and 3.

EXAMPLE 5

Manufacture of a thermoreactive paper 6 g of an aqueous dispersion which contains 1.57% of the chromenopyrazole of the formula (7) according to Example 1 and 6.7% polyvinyl alcohol are mixed with 134 g of an aqueous dispersion which contains 14% of 4,4-isopropylidene diphenol and 6% of polyvinyl alcohol. This mixture is applied to paper and dried. If this paper is brought into contact with a heated ball point pen a deep orange-red colour is obtained which has excellent fastness to light. Similar results are obtained using any one of the other colour formers specified in Examples 2 and 3.

We claim:

1. An isomeric mixture of chromenopyrazoles of the formula

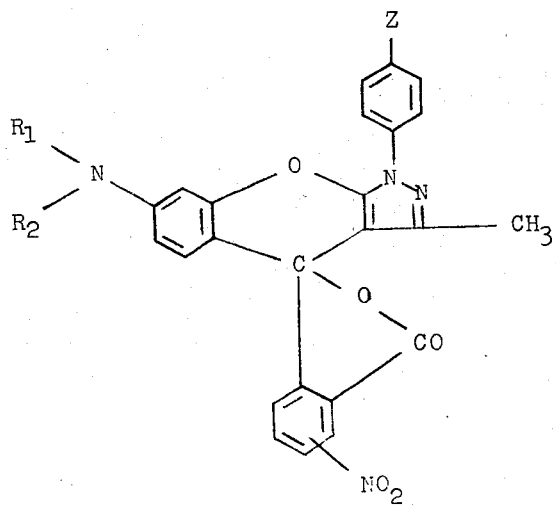

wherein $R_1$ and $R_2$ independently of the other represent alkyl of 1 to 4 carbon atoms or benzyl Z represents hydrogen, methyl or an amino group mono- or disubstituted by alkyl of 1 to 4 carbon atoms, alkanoyl of 2 to 4 carbon atoms or by benzyl.

2. An isomeric mixture of chromenopyrazoles according to claim 1, wherein Z is hydrogen or methyl.

3. An isomeric mixture of chromenopyrazoles according to claim 1, which is a mixture of the two isomers defined by the formula

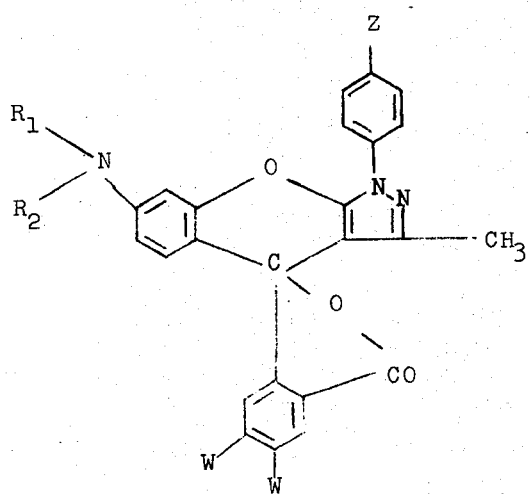

wherein $R_1$, $R_2$ and Z have the meaning given in claim 1 and one W is nitro and the other is hydrogen.

4. An isomeric mixture of chromenopyrazoles according to claim 1 which is a mixture of the two isomers defined by the formula

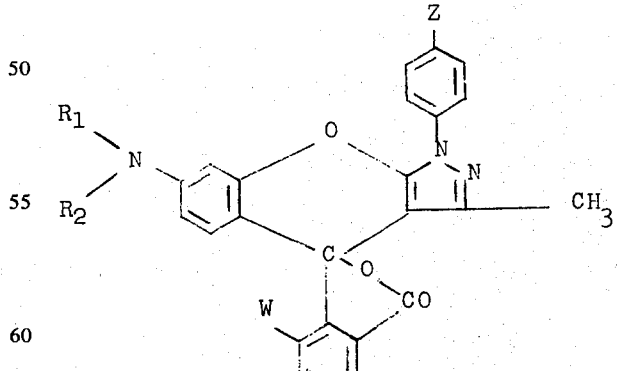

wherein $R_1$, $R_2$ and Z have the meaning given in claim 1 and one W is nitro and the other is hydrogen.

* * * * *